(12) United States Patent
Schwieger et al.

(10) Patent No.: US 8,053,032 B2
(45) Date of Patent: Nov. 8, 2011

(54) METHOD FOR PRODUCTION OF A SUBSTRATE COATED WITH A ZEOLITE LAYER

(75) Inventors: Wilhelm Schwieger, Spardorf (DE); Selvam Thangaraj, Würzburg (DE); Franziska Scheffler, Erlangen (DE); Ralph Herrmann, Halle (DE); Marthala Reddy, Ludwigsburg (DE); Walter Mittelbach, Halle (DE); Jürgen Bauer, Lichtenfels (DE); Ferdinand Schmidt, Freiburg (DE); Hans-Martin Hennig, Freiburg (DE)

(73) Assignee: SorTech AG, Halle/Saale (DE)

( * ) Notice: Subject to any disclaimer, the term of this patent is extended or adjusted under 35 U.S.C. 154(b) by 737 days.

(21) Appl. No.: 11/665,595

(22) PCT Filed: Oct. 29, 2005

(86) PCT No.: PCT/EP2005/011610
§ 371 (c)(1),
(2), (4) Date: Jul. 3, 2008

(87) PCT Pub. No.: WO2006/048211
PCT Pub. Date: May 11, 2006

(65) Prior Publication Data
US 2009/0090491 A1    Apr. 9, 2009

(30) Foreign Application Priority Data
Oct. 29, 2004 (DE) .......................... 10 2004 052 976

(51) Int. Cl.
*B05D 3/00* (2006.01)
(52) U.S. Cl. .................. 427/387; 427/388.1; 427/388.2; 427/388.4; 423/700; 502/60

(58) Field of Classification Search .................. None
See application file for complete search history.

(56) References Cited

U.S. PATENT DOCUMENTS

| | | | | |
|---|---|---|---|---|
| 6,060,415 | A * | 5/2000 | Chao et al. | 502/4 |
| 2002/0110699 | A1 | 8/2002 | Yan et al. | 428/472 |
| 2003/0091872 | A1 | 5/2003 | Yan | 428/702 |

FOREIGN PATENT DOCUMENTS

DE        10159652        9/2002
(Continued)

OTHER PUBLICATIONS

Bonaccorsi et al, Microporous and Mesoporous Materials, 74, pp. 221-229, Sep. 20, 2004.*

(Continued)

*Primary Examiner* — Erma Cameron
(74) *Attorney, Agent, or Firm* — Gerald T. Bodner

(57) ABSTRACT

The invention relates to a method for production of a zeolite layer on a substrate containing metal, comprising the following method steps: production of an aqueous suspension, comprising several components, one component comprises at least one cross-linking element from the third, fourth or fifth main group of the periodic table, the substrate containing metal comprises at least one of the cross-linking elements, introduction of the substrate containing metal to the aqueous suspension, heating the aqueous suspension and the substrate containing the metal present therein for the in-situ crystallisation of a zeolite layer on the substrate containing metal, whereby the cross-linking elements in the substrate containing metal are extracted and included in the zeolite layer, a cross-linking element present in the suspension for formation of the zeolite layer is present at a concentration so low that a crystallisation in the suspension is largely or completely avoided and said element is principally provided by the substrate.

15 Claims, 1 Drawing Sheet

FOREIGN PATENT DOCUMENTS

| | | |
|---|---|---|
| DE | 10309009 | 9/2004 |
| EP | 1222961 | 7/2002 |
| EP | 0649387 | 1/2003 |
| JP | 63-291809 | 11/1988 |
| JP | 08-119624 | 5/1996 |
| JP | 09-202614 | 8/1997 |
| JP | 2003-093857 | 4/2003 |

OTHER PUBLICATIONS

Hawley's Condensed Chemical Dictionary, Twelfth Edition, 1993, p. 907, definition of "phosphor".*

English translation of Office Action dated Jun. 2, 2010 in Japanese Patent Application No. 2007-538346.

* cited by examiner

METHOD FOR PRODUCTION OF A SUBSTRATE COATED WITH A ZEOLITE LAYER

The invention relates to a method for the production of a substrate coated with a zeolite layer, specifically to the coating of a substrate containing metal.

In the narrower, mineralogical sense zeolites are silicate minerals and specifically aluminum silicates having a chemically complex structure, which are characterized by the formation of porous tetrahedral networks (T-networks). According to the general definition of the IZA (International Zeolithe Association) zeolites relate to those materials that have T-networks with a network density of <19 T-atoms per 1000 Å$^3$. Zeolites have a structure with internal voids, wherein these voids can adopt molecular magnitudes. This is why zeolites have the property to be able to receive foreign atoms or foreign molecules, respectively, in their porous structure. For example, zeolites are able to store large quantities of water and release them again when heated. Zeolite materials in contact with a heat exchanger are, therefore, particularly suited to build up a latent heat accumulator. According to the prior art either heaped bulks of molded zeolite materials or zeolites are used, which are introduced into open-pored solid bodies, e.g. metallic sponges, being in thermal contact with a heat exchanger. As to the latter reference is made, for example, to DE 101 59 652 C2.

Furthermore, zeolites are used by the chemical industry for a plurality of other applications, for example, for ion exchange processes, wherein mostly synthetically produced zeolites in the form of powders and having a crystal size of a few micrometers are employed. Moreover, zeolites are used as molecular sieves. In this case, too, the zeolite material can be introduced into a filter system in the form of a loose bulk of crystals or molded materials.

For applications in which heat is supplied to the zeolites or heat is to be extracted from the zeolite material, respectively, loose zeolite bulks are therefore not suitable because a sufficient thermal contact to adjacent heat exchanger structures can only be accomplished insufficiently. Moreover, specifically for latent heat accumulators, the working medium usually referred to as sorbate must be supplied to the zeolite as sorbent material in an effective manner. This requires macroscopic transport pores in the sorbent material. For such purposes of application, the zeolite synthesized as a powder is therefore formed to larger units in the form of pellets with the aid of a binder. It is disadvantageous, however, that the application-relevant properties of the zeolites are influenced and, in most cases, changed disadvantageously by most of the binding agents. Moreover, the use of pellets cannot yet ensure a sufficient thermal contact to adjacent heat exchangers. For this reason, systems of heat exchangers are proposed, onto which a zeolite layer is applied. Typical of the known coating methods of substrates with zeolites is a two-stage procedure. First, a zeolite powder is produced in a preceding synthesis step. This zeolite powder can be subjected to a mechanical secondary treatment, e.g. crushing or milling steps, so as to obtain a powdery zeolite having a standard particle (crystal) size. Next, the so synthesized or presynthesized zeolite material is usually mixed with a binder and applied to the carrier substrate as so-called coating.

However, this procedure has the disadvantage that specifically with complex three-dimensional heat exchanger structures the application of zeolite layers having a uniform thickness to the entire surface of the heat exchanger is difficult. Moreover, such a postsynthetic coating method includes a plurality of production steps. Furthermore, most of the binders change the relevant properties of the zeolites because the binding molecules and particles settle down on the surface of the zeolite crystals.

US 2003/0091872 A1 describes a method for producing a zeolite layer on a metal such as aluminum or nickel or steel or titanium, on which classical aluminum silicates are built up. This can be achieved with the use of synthesis suspensions for classical aluminum silicate zeolites in the usual pH-range from neutral to pH 12. Also the suspension contains aluminum. After the introduction of the aluminum-containing substrate into the aluminum-containing suspension aluminum atoms of the substrate are incorporated into the zeolite network by which the adhesion of the zeolite layer on the substrate is improved.

DE 103 09 009 A1 describes a method in which ceramic carrier materials are used. The carrier is thereby simultaneously the donor for the cross-linked material former silicon for the production of classical aluminum silicate zeolites.

Also, other publications have become known, which describe the production of a suspension with elements capable of forming a zeolite, moreover the introduction of a substrate into the suspension as well as the heating for the in-situ crystallization of a highly viscous layer of classical aluminum silicate zeolites on the substrate. See EP 0 649 387 B2, EP 1 222 961 A2 and JP 08119624 A.

The prior art methods were not fully satisfying. Though layers of classical aluminum silicate zeolites are formed thereby, their anchoring on the substrate is not as perfect as it should be.

The invention is based on the object to provide a method for the production of zeolite layers on metal-containing substrates by which the properties of the zeolites are not negatively influenced and which ensures that an unobstructed access to the microporous structure of the zeolite layer is guaranteed. Above all, the zeolite layer should be anchored on the substrate reliably. The zeolite layer applied to the metal-containing substrate should thus be characterized by a good adhesion on the metal-containing substrate. In contrast to the prior art the method should, moreover, be performable with a reduced number of method steps, and it should further be suited to apply a zeolite layer of a uniform thickness on substrates having a complex three-dimensional structure, specifically heat exchangers.

Figure 1:
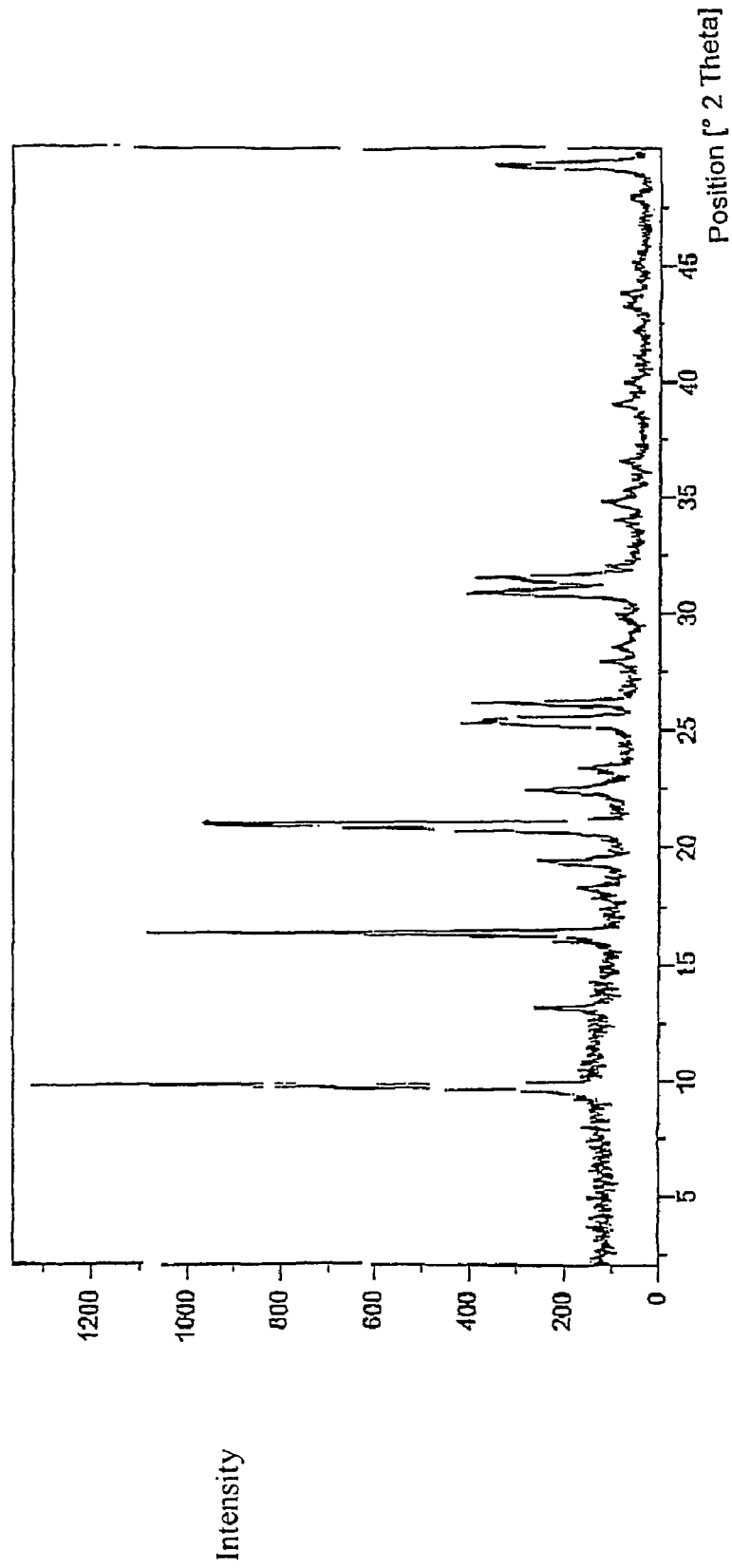
FIG. 1 is a graph which shows the X-ray diffractogram of a zeolite layer produced in accordance with the present invention on an Al substrate, with the abscissa indicating the angles and the ordinate assigning relative intensities corresponding to the same.

For solving the object the inventors have initially realized that a zeolite layer on a substrate containing a metal has to be produced by means of an in-situ synthesis so as to avoid the use of binders for solidifying postsynthetically produced zeolites on the substrate. In a further step it was recognized by the inventors that such an in-situ crystallization of zeolite layers on substrates containing metal leads to a particularly intimate contact between the zeolite layer and the substrate if atoms are selectively extracted from the substrate during the in-situ crystallization and are included in the network of the zeolite being formed. In the present application this condition is referred to as directed "direct synthesis".

For realizing the direct synthesis in the in-situ crystallization of the zeolite layers on the substrate containing metal such a substrate containing metal is started out from which includes a sufficient portion of cross-linking elements of the third, fourth or fifth main group of the periodic table. The use of a substrate containing metal which contains aluminum and/or silicon is particularly preferred. In the simplest case this is a substrate of aluminum or a substrate having an aluminum coating. Moreover, alloys containing aluminum or silicon come into consideration, which can be, for example, an alloy steel comprising, according to ISO 4948, a mass content of at least 0.1% by weight of aluminum and/or at least 0.5% by weight of silicon.

As alternative substrate material ceramic materials may be used, which contain a corresponding portion of a component that serves as source for cross-linking elements in the direct crystallization of the zeolite layers. Again, specifically ceramics including an aluminum portion are here advantageous.

Corresponding to the classical zeolite synthesis processes the starting materials necessary for the formation of the zeolite structure are introduced into an aqueous suspension. Such an aqueous suspension comprises at least one cross-linking element from the third, fourth or fifth main group of the periodic table.

In the method according to the invention, as compared to the classical zeolite synthesis, a concentration of at least one of the cross-linking elements for the zeolite layer in the aqueous suspension is adjusted such that it does not optimally satisfy the need for this cross-linking element. In the following this will be referred to as "deficiency". That is, at least one of the cross-linking components in the reaction mixture formed by an aqueous suspension is provided deficiently with respect to the zeolite formation process and the final structure of the zeolite.

The inventors have recognized the following:

If the suspension contains an amount of the cross-linking element for the zeolite layer greater than the aforementioned deficiency, an undesired crystallization occurs everywhere in the bulk volume in the suspension unless this is avoided by local temperature ratios. Though the crystals formed thereby are present, they are not or not to the desired extent anchored on the substrate because the cross-linking elements are optimally provided everywhere in the suspension. However, if a cross-linking element is only provided deficiently, it can be made available by the substrate to the necessary extent if the reaction is controlled in an appropriate manner. Thus, one could also say that the suspension is depleted with respect to one of the cross-linking elements. However, if the cross-linking element is only provided deficiently, the zeolite being formed is eagerly entering into a chemical reaction with the corresponding cross-linking element of the substrate.

It may be that the layer being formed and anchored on the substrate is relatively thin. Should this be disadvantageous in the specific case, the process can be readily repeated by performing another in-situ crystallization with correspondingly adjusted concentrations of the cross-linking elements in the suspension on the first zeolite layer anchored on the substrate in a further method step. The first zeolite layer anchored on the substrate thereby represents the reservoir for the cross-linking elements of the crystal germs for the repeated crystallization and is, thus, also the starting point for the further crystallization process.

The molar ratio of the deficiently provided cross-linked material former in the suspension to the sum of all cross-linking elements in the suspension should be within the range of the following values: less than 0.5 or than 0.4 or than 0.3, or than 0.2 or than 0.1.

The gist of the invention can be summarized as follows: Due to the small portion of a cross-linked material former in the suspension a crystallization in the suspension is initially avoided. It is rather given priority to generate a situation on the interface to the substrate which results in a chemical bond of the two cross-linked material formers, the one from the substrate and the other from the suspension. The cross-linked material former from the substrate may thereby be aluminum and the cross-linked material former from the suspension may be phosphor. Thus, one component is not at all or largely not provided in the surrounding suspension, so that the crystallization in the suspension does not take place initially.

Thus, the system according to the invention comprises a substrate and a suspension. The substrate is not only the carrier, but donor of a cross-linking element at the same time. The suspension contains at least water and phosphate ions and, in addition, possibly template compounds which are structure-directive agents (SDA) such as tetraalkyl ammonium salts or surface-active agents, so-called tensides.

The suspension may also contain Si, but also transition metal ions.

It will be appreciated that additional measures or steps may be required to carry out the method. This includes heating the aqueous suspension. The portions of the cross-linked material formers deficiently provided in the aqueous suspension, which are necessary to build up the zeolite layer, are then—according to the inventive method—directly extracted from the substrate in the in-situ synthesis. This, again, entails that these cross-linking atoms change from the substrate over into the growing zeolite layer whereby it is accomplished that the zeolite layer and the substrate grow into each other. By this measure a particularly intimate contact and a mechanically stable zeolite coating of the zeolites produced by means of the in-situ crystallization on the substrate containing metal can be effected.

The concentration or, respectively, the missing quantity of cross-linking elements in the aqueous suspension can be adjusted in dependence on the choice of the substrate containing metal and its ability to release cross-linking atoms in the in-situ crystallization. In the extreme case at least one of the cross-linking elements in the substrate may be substantially waived.

The further synthesis conditions for the in-situ crystallization in connection with a direct synthesis for the production of permanent zeolite layers on substrates containing metal can be selected, according to the discretion of the person skilled in the art, in accordance with the classical zeolite synthesis.

For carrying out the synthesis the substrate to be coated is introduced into the aqueous suspension of the starting materials. The aqueous suspension and the substrate located therein are then subjected to a hydrothermal treatment. Preferably temperatures between 50 and 250° C. and specifically preferably between 100° and 200° C. are hereby set during the in-situ crystallization. Besides, an autogenous pressure is preferably used, i.e. one that is built up in the reaction mixture in the closed reaction vessel in response to the process temperature and the adjusting vapor pressures. When the in-situ crystallization is completed it is, moreover, preferred that the coated substrate be cooled as fast as possible to stop the reaction. This can be achieved, for example, with an air flow around the reaction aggregate or other suitable process-technological measures.

SAPO and ALPO and MeALPO layers produced by means of in-situ and direct crystallization have proved to be a specifically preferred zeolite coating. Apart from silicon and aluminum as cross-linking elements microporous SAPO layers contain phosphor. Accordingly, MeALPO materials also contain various transition metal ions as cross-linking elements. Microporous ALPO coatings are made of aluminum and phosphor, from which the tetrahedrons are formed as structural units for the network skeleton which are, again, put together to ring-shaped secondary structural units (e.g. 4-rings and 6-rings) which are then associated further to tertiary structural units, again, to the final zeolite structure.

The method according to the invention will be explained below by means of an exemplary embodiment, in which a SAPO 34 is produced on an aluminum substrate.

First, an aqueous suspension of 23.6 g water and 2.38 g of an 85% phosphoric acid, which serves as phosphor source, 2.0 g silica sol (30.4% $SiO_2$ in water) as silicon source and 5.4 g morpholine as template molecule is produced. The aforementioned indications of weight are thereby rounded. In detail, a first partial mixture is produced by submitting the phosphoric acid and 9.4 g water to a mixing vessel. Furthermore, a second partial mixture is produced, which is composed of 2.0 g silica sol and 5.4 g morpholine and 9.4 g water and which is added drop-wise to the first partial mixture under constant agitation. The finished first partial mixture is composed of 6 g water, 6 g of an 85% phosphoric acid and 3.6 g pseudo-boehmite. Moreover, a second partial mixture is produced, which is composed of 1.6 g aerosil and 4.5 g morpholine and 6 g water and which is added drop-wise to the first partial mixture under constant agitation. Then, 4.8 g water is added to the so provided mixture of the first and second partial mixtures and the agitation is continued for another two hours so as to obtain an aqueous suspension ready for use. In the specific example, the aqueous suspension does not contain any aluminum (extreme deficiency), wherein the optimum aluminum/phosphor ratio would substantially be 1:1. In the production of the zeolite layer aluminum is accordingly extracted from the substrate to compensate for this deficiency in terms of a direct synthesis and is introduced into the growing on SAPO layer.

For the in-situ crystallization the aqueous suspension and the aluminum substrate to be coated, which can be, for example, a heat exchanger of aluminum or one having an aluminum coating, are given into a reactor and kept at 200° C. for a period of, for example, 24 hours. During this period a microporous SAPO-34-layer is produced on the aluminum by means of the in-situ crystallization and with the direct use of aluminum atoms from the aluminum substrate. The so coated aluminum carrier is removed from the reactor, wherein advantageously a subsequent washing step is performed.

FIG. 1 shows the X-ray diffractogram of a zeolite layer produced in this way on an Al-substrate, with the abscissa indicating the angles and the ordinate assigning relative intensities corresponding to the same. A copper K-alpha-line was used for the detection. In a comparison with values known from the literature the X-ray diffractogram shown in FIG. 1 furnishes a structure proof for SAPO 34. The inventors have recognized the following: When the inventive strongly diluted suspension is used, in which one cross-linking element for forming the zeolite layer is provided deficiently and the water content was increased significantly over the prior art, a preferred orientation of the crystals on the substrate is obtained. This orientation is shown in that the main and growth direction of the crystals extends more or less vertically to the surface of the substrate and the crystals stand on the same mainly vertically. The preferred orientation is a largely uniform orientation of the crystals and guarantees a uniform accessibility of reactants or sorbents into the micropore system of the produced crystals. This is another advantageous effect obtained with the invention.

With respect to its properties the aqueous synthesis suspension as used can vary in response to its composition from a clear solution, in which all constituents are provided in a dissolved form, to a highly viscous gel. In an advanced embodiment of the invention the aqueous suspension is processed to form a gel before contacting the substrate to be coated, and the reaction mixture in gel form is applied to the substrate to be coated, for example, by means of a sol-gel-process. In the present application the aqueous suspension described above therefore also includes one that is highly viscous. Accordingly, an aqueous suspension includes, in the broadest sense, a reaction mixture containing water, the consistency of which shall not be limited to an aqueous one only, however.

The invention claimed is:

1. Method for the production of a zeolite layer on a substrate containing aluminum, comprising the following method steps:
   1.1 production of an aqueous suspension comprising several components, wherein
   1.2 one component comprises at least one cross-linking element from the third, fourth or fifth main group of the periodic table; and
   1.3 the substrate containing aluminum comprises at least one of the cross-linking elements;
   1.4 introduction of the substrate containing aluminum into the aqueous suspension;
   1.5 heating the aqueous suspension and the substrate containing aluminum present therein for the in-situ crystallization of a zeolite layer on the substrate containing aluminum, characterized in that
   1.6 at least one of the cross-linking elements present in the aqueous suspension is deficient with respect to the zeolite formation process and the final structure of the zeolite, wherein the molar ratio of the deficient cross-linking element(s) present in the aqueous suspension to the sum of all cross-linking elements present in the aqueous suspension is less than 0.5,
   1.7 the deficiently provided cross-linking element(s) is/are extracted from the substrate containing aluminum and included in the zeolite layer; and
   1.8 one cross-linking element is phosphor, which is present in the aqueous suspension.

2. Method according to claim 1, characterized in that the molar ratio of at least one deficient cross-linking element present in the aqueous suspension to the sum of all cross-linking elements in the aqueous suspension is less than 0.4.

3. Method according to claim 2, characterized in that the substrate containing aluminum contains silicon or phosphor or is coated with an alloy or compound containing aluminum, silicon or phosphor.

4. Method according to claim 1, characterized in that the substrate containing aluminum contains silicon or phosphor or is coated with an alloy or compound containing aluminum, silicon or phosphor.

5. Method according to claim 1, characterized in that the substrate containing aluminum is a steel alloyed with aluminum and/or silicon.

6. Method according to claim 1, characterized in that the substrate containing aluminum is a ceramic substrate which contains aluminum and/or silicon.

7. Method according to claim 1, characterized in that the aqueous suspension comprises at least one organic stencil molecule or one organic template molecule.

8. Method according to claim 1, characterized in that the aqueous suspension and the substrate containing aluminum present therein are heated to a temperature between 50° C. and 250° C.

9. Method according to claim 8, characterized in that the aqueous suspension and the substrate containing aluminum present therein are heated in a closed vessel.

10. Method according to claim 1, characterized in that the aqueous suspension is transformed to a gel and the gel is applied to the substrate.

11. Method according to claim 1, characterized in that another zeolite layer is crystallized onto the first zeolite layer formed on the substrate.

12. Substrate containing aluminum, which is provided with a zeolite layer according to the method of claim 1.

13. Substrate containing aluminum according to claim 12, which is provided with a zeolite layer in the form of a microporous SAPO-material, a microporous ALPO-material or a microporous MeALPO-material.

14. Method according to claim 1, characterized in that the aqueous suspension and the substrate containing aluminum present therein are heated to a temperature between 100° C. and 200° C.

15. Heat exchanger having a substrate material containing aluminum, which is coated with a zeolite layer according to the method of claim 1, said zeolite layer being a microporous SAPO material, a microporous ALPO material or a microporous MeALPO material, and wherein the crystals of the zeolite layer are oriented more or less perpendicular to the substrate surface in their main and growth direction.

* * * * *